(12) United States Patent
Mola (10) Patent No.: US 10,496,537 B2
(45) Date of Patent: Dec. 3, 2019

(54) TRACE RECORDING BY LOGGING INFLUXES TO A LOWER-LAYER CACHE BASED ON ENTRIES IN AN UPPER-LAYER CACHE

(71) Applicant: MICROSOFT TECHNOLOGY LICENSING, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 15/904,072

(22) Filed: Feb. 23, 2018

(65) Prior Publication Data

US 2019/0266090 A1 Aug. 29, 2019

(51) Int. Cl.
  *G06F 12/00* (2006.01)
  *G06F 12/0815* (2016.01)
  *G06F 12/0811* (2016.01)
  *G06F 12/0897* (2016.01)
  *G06F 12/0808* (2016.01)
  *G06F 11/34* (2006.01)

(52) U.S. Cl.
  CPC ...... *G06F 12/0815* (2013.01); *G06F 11/3476* (2013.01); *G06F 12/0808* (2013.01); *G06F 12/0811* (2013.01); *G06F 12/0897* (2013.01)

(58) Field of Classification Search
  CPC .................................................. G06F 12/0815
  See application file for complete search history.

(56) References Cited

U.S. PATENT DOCUMENTS

| | | | |
|---|---|---|---|
| 4,598,364 A | 7/1986 | Gum et al. |
| 5,381,533 A | 1/1995 | Peleg et al. |
| 5,905,855 A | 5/1999 | Klaiber et al. |
| 5,944,841 A | 8/1999 | Christie |
| 6,009,270 A | 12/1999 | Mann |
| 6,094,729 A | 7/2000 | Mann |
| 6,101,524 A | 8/2000 | Choi et al. |

(Continued)

OTHER PUBLICATIONS

Ponugoti et al., Exploiting Cache Coherence for Effective On-the-Fly Data Tracing in Multicores, 34th International Conference on Computer Design (ICCD), IEEE, 2016 (Year: 2016).*

(Continued)

*Primary Examiner* — Ryan Bertram
*Assistant Examiner* — Trang K Ta
(74) *Attorney, Agent, or Firm* — Workman Nydegger (57) ABSTRACT

Trace recording based on recording an influx to a lower-level cache by reference to prior log data, based on knowledge of an upper-level cache. A computing device includes a plurality of processing units, a plurality of N-level caches, and an (N+i)-level cache that is a backing store for the N-level caches. Based on activity of a first processing unit, the computing device detects an influx of data to a first N-level cache. The computing device checks the (N+i)-level cache to determine if the data was already logged for a second processing unit. Based on the check, the computing device (i) causes the data to be logged for the first processing unit by reference to log data (i.e., when the data was already logged), or causes the data to be logged by value for the first processing unit (i.e., when the data was not already logged).

20 Claims, 5 Drawing Sheets

(56) References Cited

U.S. PATENT DOCUMENTS

| | | | |
|---|---|---|---|
| 6,167,536 | A | 12/2000 | Mann |
| 6,351,844 | B1 | 2/2002 | Bala |
| 6,634,011 | B1 | 10/2003 | Peltier et al. |
| 6,728,949 | B1 | 4/2004 | Bryant et al. |
| 6,854,108 | B1 | 2/2005 | Choi |
| 7,055,070 | B1 | 5/2006 | Uhler et al. |
| 7,089,400 | B1 | 8/2006 | Pickett et al. |
| 7,178,133 | B1 | 2/2007 | Thekkath |
| 7,181,728 | B1 | 2/2007 | Thekkath |
| 7,448,025 | B2 | 11/2008 | Kalafatis et al. |
| 7,620,938 | B2 | 11/2009 | Edwards et al. |
| 7,676,632 | B2 | 3/2010 | Miller |
| 7,877,630 | B1 | 1/2011 | Favor et al. |
| 7,958,497 | B1 | 6/2011 | Lindo et al. |
| 8,010,337 | B2 | 8/2011 | Narayanan et al. |
| 8,423,965 | B2 | 4/2013 | Goel et al. |
| 8,468,501 | B2 | 6/2013 | Subhraveti |
| 8,484,516 | B2 | 7/2013 | Giannini et al. |
| 8,499,200 | B2 | 7/2013 | Cathro |
| 8,612,650 | B1 | 12/2013 | Carrie et al. |
| 8,719,796 | B2 | 5/2014 | Rosu et al. |
| 9,015,441 | B2 | 4/2015 | Worthington et al. |
| 9,058,415 | B1 | 6/2015 | Serebrin et al. |
| 9,268,666 | B2 | 2/2016 | Law et al. |
| 9,300,320 | B2 | 3/2016 | Ansari et al. |
| 9,361,228 | B2 | 6/2016 | Turner et al. |
| 9,535,815 | B2 | 1/2017 | Smith et al. |
| 9,569,338 | B1 | 2/2017 | Bradbury et al. |
| 9,767,237 | B2 | 9/2017 | Suresh et al. |
| 10,031,833 | B2 | 7/2018 | Mola |
| 10,031,834 | B2 | 7/2018 | Mola |
| 2002/0124237 | A1 | 9/2002 | Sprunt et al. |
| 2002/0144101 | A1 | 10/2002 | Wang et al. |
| 2003/0079205 | A1 | 4/2003 | Miyao et al. |
| 2003/0126508 | A1 | 7/2003 | Litt |
| 2004/0117690 | A1 | 6/2004 | Andersson |
| 2005/0155019 | A1 | 7/2005 | Levine et al. |
| 2005/0223364 | A1 | 10/2005 | Peri et al. |
| 2006/0112310 | A1 | 5/2006 | Mchale et al. |
| 2006/0230390 | A1 | 10/2006 | Alexander et al. |
| 2007/0106827 | A1 | 5/2007 | Boatright et al. |
| 2007/0130237 | A1 | 6/2007 | Altman et al. |
| 2007/0150881 | A1 | 6/2007 | Khawand et al. |
| 2007/0214342 | A1 | 9/2007 | Newburn et al. |
| 2007/0220361 | A1 | 9/2007 | Barnum et al. |
| 2008/0065810 | A1 | 3/2008 | Spanel et al. |
| 2008/0091867 | A1 | 4/2008 | Plondke et al. |
| 2008/0114964 | A1 | 5/2008 | Davis et al. |
| 2008/0115113 | A1 | 5/2008 | Codrescu et al. |
| 2008/0215920 | A1 | 9/2008 | Mayer et al. |
| 2008/0250207 | A1 | 10/2008 | Davis et al. |
| 2008/0256396 | A1 | 10/2008 | Giannini et al. |
| 2008/0288826 | A1 | 11/2008 | Nemoto |
| 2009/0037886 | A1 | 2/2009 | Mccoy et al. |
| 2009/0144742 | A1 | 6/2009 | Subhraveti et al. |
| 2010/0205484 | A1 | 8/2010 | Dragicevic et al. |
| 2010/0250856 | A1 | 9/2010 | Owen et al. |
| 2010/0251031 | A1 | 9/2010 | Nieh et al. |
| 2010/0268995 | A1 | 10/2010 | Goodman et al. |
| 2011/0271070 | A1 | 11/2011 | Worthington et al. |
| 2011/0276761 | A1 | 11/2011 | Saha et al. |
| 2011/0288847 | A1 | 11/2011 | Narayanan et al. |
| 2012/0095728 | A1 | 4/2012 | Ubukata |
| 2013/0036403 | A1 | 2/2013 | Geist |
| 2013/0086567 | A1 | 4/2013 | Inoue et al. |
| 2014/0059523 | A1 | 2/2014 | Frazier et al. |
| 2014/0281710 | A1 | 9/2014 | Cain et al. |
| 2014/0372987 | A1 | 12/2014 | Strong et al. |
| 2015/0089155 | A1 | 3/2015 | Busaba et al. |
| 2015/0089301 | A1 | 3/2015 | Laurenti |
| 2015/0355996 | A1 | 12/2015 | Smith et al. |
| 2015/0378870 | A1 | 12/2015 | Marron et al. |
| 2016/0292061 | A1 | 10/2016 | Marron et al. |
| 2017/0052876 | A1 | 2/2017 | Svensson et al. |
| 2017/0140082 | A1 | 5/2017 | Suresh et al. |
| 2017/0161173 | A1 | 6/2017 | Bradbury et al. |
| 2018/0060214 | A1 | 3/2018 | Mola |
| 2018/0060215 | A1 | 3/2018 | Mola |
| 2018/0314623 | A1 | 11/2018 | Mola |
| 2019/0266086 | A1 | 8/2019 | Mola et al. |

OTHER PUBLICATIONS

"International Search Report and Written Opinion Issued in PCT Application No. PCT/US2019/017737", dated May 3, 2019, 12 Pages.

"7 Recording Inferior's Execution and Replaying It", Retrieved From: https://web.archive.org/web/20161009233228/https://sourceware.org/gdb/onlinedocs/gdb/Process-Record-and-Replay.html, Retrieved on: May 27, 2016, 6 Pages.

"Non-final Office Action Issued in U.S. Appl. No. 15/349,555", dated Oct. 6, 2017, 22 Pages.

"Elm's Time Traveling Debugger", Retrieved From: https://web.archive.org/web/20160522023348/http://debug.elm-lang.org/, Retrieved on: May 22, 2016, 4 Pages.

"IntelliTrace", Retrieved From: https://web.archive.org/web/20160521122918/https://msdn.microsoft.com/en-us/library/dd264915.aspx, Retrieved Date: May 21, 2016, 5 Pages.

"rr: Lightweight Recording & Deterministic Debugging", Retrieved From: https://web.archive.org/web/20160521063109/https://rr-project.org/, Retrieved on: May 21, 2016, 4 Pages.

"Non-Final Office Action Issued in U.S. Appl. No. 15/252,998", dated Sep. 20, 2017, 15 Pages.

"Non-final Office Action Issued in U.S. Appl. No. 15/253,027", dated Oct. 10, 2017, 25 Pages.

"Notice of Allowance Issued in U.S. Appl. No. 15/253,027", dated Mar. 21, 2018, 13 Pages.

"Notice of Allowance Issued in U.S. Appl. No. 15/349,555", dated Mar. 29, 2018, 21 Pages.

Barr, et al., "TARDIS: Affordable Time-Travel Debugging in Managed Runtimes", In Proceedings of the International Conference on Object Oriented Programming Systems Languages & Applications, Oct. 20, 2014, 16 Pages.

Bhansali, et al., "Framework for Instruction-level Tracing and Analysis of Program Executions", In Proceedings of the 2nd International Conference on Virtual Execution Environments, Jun. 14, 2006, pp. 154-163.

Brady, Fiorenza, "Cambridge University Study States Software Bugs Cost Economy $312 Billion Per Year", Retrieved From: http://www.prweb.com/releases/2013/1/prweb10298185.htm, Jan. 8, 2013, 4 Pages.

Charles, "Arun Kishan: Inside Windows 7—Farewell to the Windows Kernel Dispatcher Lock", Retrieved From: https://channel9.msdn.com/shows/Going+Deep/Arun-Kishan-Farewell-to-the-Windows-kernel-Dispatcher-Lock/, Aug. 6, 2009, 9 Pages.

Dimitrov, et al., "Time-Ordered Event Traces: A New Debugging Primitive for Concurrency Bugs", In Proceedings of IEEE International Parallel & Distributed Processing Symposium (IPDPS), May 16, 2011, pp. 311-321.

Guo, et al., "R2: An Application-Level Kernel for Record and Replay", In Proceedings of the 8th USENIX Symposium on Operating Systems Design and Implementation, Dec. 8, 2008, pp. 193-208.

Hower, et al., "Two Hardware-Based Approaches for Deterministic Multiprocessor Replay", Published in Communications of the ACM, vol. 52, Issue 6, Jun. 1, 2009, pp. 93-100.

Jiang, et al., "CARE: Cache Guided Deterministic Replay for Concurrent Java Programs", In Proceedings of the 36th International Conference on Software Engineering, May 31, 2014, 11 Pages.

King, et al., "Debugging Operating Systems With Time-Traveling Virtual Machines", In Proceedings of Annual USENIX Technical Conference, Apr. 10, 2005, pp. 1-15.

Kleen, Andi, "Adding Processor Trace Support to Linux", Retrieved From: https://lwn.net/Articles/648154/, Jul. 1, 2015, 7 Pages.

(56) References Cited

OTHER PUBLICATIONS

Lai, et al., "A Versatile Data Cache for Trace Buffer Support", In Journal of IEEE Transactions on Circuits and Systems, vol. 61, Issue 11, Nov. 2014, pp. 3145-3154.

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

Liang, et al., "Improved Procedure Placement for Set Associative Caches", In Proceedings of the International Conference on Compilers, Architectures and Synthesis for Embedded Systems, Oct. 24, 2010, pp. 147-156.

Liang, et al., "Instruction Cache Locking Using Temporal Reuse Profile", In Proceedings of the 47th Design Automation Conference, Jun. 13, 2010, pp. 344-349.

Mercer, et al., "Model Checking Machine Code with the GNU Debugger", In Proceedings of the 12th International Conference on Model Checking Software, Aug. 22, 2005, 15 Pages.

Xu, et al., "ReTrace: Collecting Execution Trace with Virtual Machine Deterministic Replay", In Proceedings of the Third Annual Workshop on Modeling, Benchmarking and Simulation, Jan. 1, 2007, 8 Pages.

Narayanasamy, et al., "BugNet: Continuously Recording Program Execution for Deterministic Replay Debugging", In Proceedings of the 32nd Annual International Symposium on Computer Architecture, Jun. 4, 2005, 12 Pages.

"International Search Report and Written Opinion Issued in PCT Application No. PCT/US2017/048094", dated Nov. 10, 2017, 12 Pages.

"International Search Report and Written Opinion Issued in PCT Application No. PCT/US2017/060075", dated Feb. 28, 2018, 11 Pages.

Rivers, et al., "Utilizing Reuse Information in Data Cache Management", In Proceedings of the 12th International Conference on Supercomputing, Jul. 13, 1998, pp. 449-456.

Sahuquillo, et al., "The Filter Cache: A Run-Time Cache Management Approach", In Proceedings of 25th EUROMICRO Conference, Sep. 8, 1999, 8 Pages.

Shaaban, et al., "Improving Trace Cache Hit Rates Using the Sliding Window Fill Mechanism and Fill Select Table", In Proceedings of the Workshop on Memory System Performance, Jun. 8, 2004, pp. 36-41.

Sharma, Suchakrapani Datt., "Hardware Tracing with Intel Processor Trace", Retrieved From: http://hsdm.dorsal.polymtl.ca/system/files/10Dec2015_0.pdf, Dec. 10, 2015, 30 Pages.

Tchagou, et al., "Reducing Trace Size in Multimedia Applications Endurance Tests", In Proceedings of Design, Automation & Test in Europe Conference & Exhibition (DATE), Mar. 9, 2015, 2 Pages.

Uzelac, et al., "Hardware-Based Load Value Trace Filtering for On-the-Fly Debugging", In Proceedings of ACM Transactions on Embedded Computing Systems, vol. 12, Issue 2, Article 97, May 2013, 18 pages.

"International Search Report and Written Opinion Issued in PCT Application No. PCT/US19/017912", dated May 21, 2019, 14 Pages.

Ponugoti, et al., "Exploiting cache coherence for effective on-the-fly data tracing in multicores", In Proceedings of IEEE 34th International Conference on Computer Design(ICCD), Oct. 2, 2016, pp. 312-319.

\* cited by examiner

TRACE RECORDING BY LOGGING INFLUXES TO A LOWER-LAYER CACHE BASED ON ENTRIES IN AN UPPER-LAYER CACHE

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

Several considerations can be taken into account when recording trace files. Most prominently, there is an inherent tradeoff between the robustness of the trace data recorded and the overheads incurred by tracing a program. These tradeoffs are manifest primarily in trace file size and performance impacts on execution of the traced program. Moreover, since tracing might be accomplished with hardware assistance (or entirely in software), there may also be hardware design and other hardware cost considerations.

BRIEF SUMMARY

Embodiments described herein are directed to mechanisms for creating bit-accurate "time travel" trace recordings using hardware assistance by a processor. These mechanisms are based on tracing the effects of execution across a plurality of processing units using at least two tiers or layers of processor caches. In particular, these mechanisms could modify a processor's hardware and/or microcode so that it assists in (i) detecting an influx (i.e., cache miss) to an inner or "lower-layer" processor cache based on activity by a traced processing unit, and (ii) using an outer or "upper-layer" shared processor cache to determine if data of that influx has already been logged on behalf of another traced processing unit. If that data has already been logged, then the influx can be logged by reference to the prior log entry. These techniques can be extended to "N" levels of caches. Recording trace files in this manner may need only modest processor modifications and, when compared to prior trace recording approaches, it can reduce by several orders of magnitude both the performance impact of trace recording as well as trace file size.

Embodiments are directed to computing device(s) that include a plurality of processing units, a plurality of N-level caches, and an (N+i)-level cache. The (N+i)-level cache is associated with two or more of the plurality of N-level caches and is configured as a backing store for the plurality of N-level caches. In these embodiments, the computing device(s) include control logic that configures the computing device(s) to detect an influx to a first N-level cache of plurality of N-level caches and in which the influx comprises data stored at a memory location. The control logic also configures the computing device(s) to check the (N+i)-level cache to determine if the data for the memory location has been previously logged on behalf of a second processing unit. The control logic also configures the computing device(s), based on this check, to perform one of (i) causing the data for the memory location to be logged on behalf of the first processing unit by reference to log data that was previously logged on behalf of the second processing unit (i.e., when the data for the memory location has been previously logged on behalf of the second processing unit), or (ii) causing the data for the memory location to be logged by value on behalf of the first processing unit (i.e., when the data for the memory location has not been previously logged on behalf of the second processing unit).

Embodiments are also directed to methods for trace recording based on recording an influx to a lower-level cache by reference to prior log data based on knowledge of one or more upper-level caches. These methods are implemented at a computing device that includes (i) a plurality of processing units, (ii) a plurality of N-level caches, and (iii) an (N+i)-level cache that is associated with two or more of the plurality of N-level caches, and that is configured as a backing store for the plurality of N-level caches. The method includes detecting an influx to a first N-level cache of plurality of N-level caches, the influx comprising data stored at a memory location. The method also includes based on detecting the influx to the first N-level cache, checking the (N+i)-level cache to determine if the data for the memory location has been previously logged on behalf of a second processing unit. The method also includes, based on this check, performing one of (i) when the data for the memory location has been previously logged on behalf of the second processing unit, causing the data for the memory location to be logged on behalf of the first processing unit by reference to log data that was previously logged on behalf of the second processing unit, or (ii) when the data for the memory location has not been previously logged on behalf of the second processing unit, causing the data for the memory location to be logged by value on behalf of the first processing unit.

Embodiments may also be embodied as computer-executable instructions (e.g., processor microcode) stored on a hardware storage device, and that are executable to perform the foregoing method.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein are directed to mechanisms for creating bit-accurate "time travel" trace recordings using hardware assistance by a processor. These mechanisms are based on tracing the effects of execution across a plurality of processing units using at least two tiers or layers of processor caches. In particular, these mechanisms could modify a processor's hardware and/or microcode so that it assists in (i) detecting an influx (i.e., cache miss) to an inner or "lower-layer" processor cache based on activity by a traced processing unit, and (ii) using an outer or "upper-layer" shared processor cache to determine if data of that influx has already been logged on behalf of another traced processing unit. If that data has already been logged, then the influx can be logged by reference to the prior log entry. These techniques can be extended to "N" levels of caches. Recording trace files in this manner may need only modest processor modifications and, when compared to prior trace recording approaches, it can reduce by several orders of magnitude both the performance impact of trace recording as well as trace file size.

Figure 1:
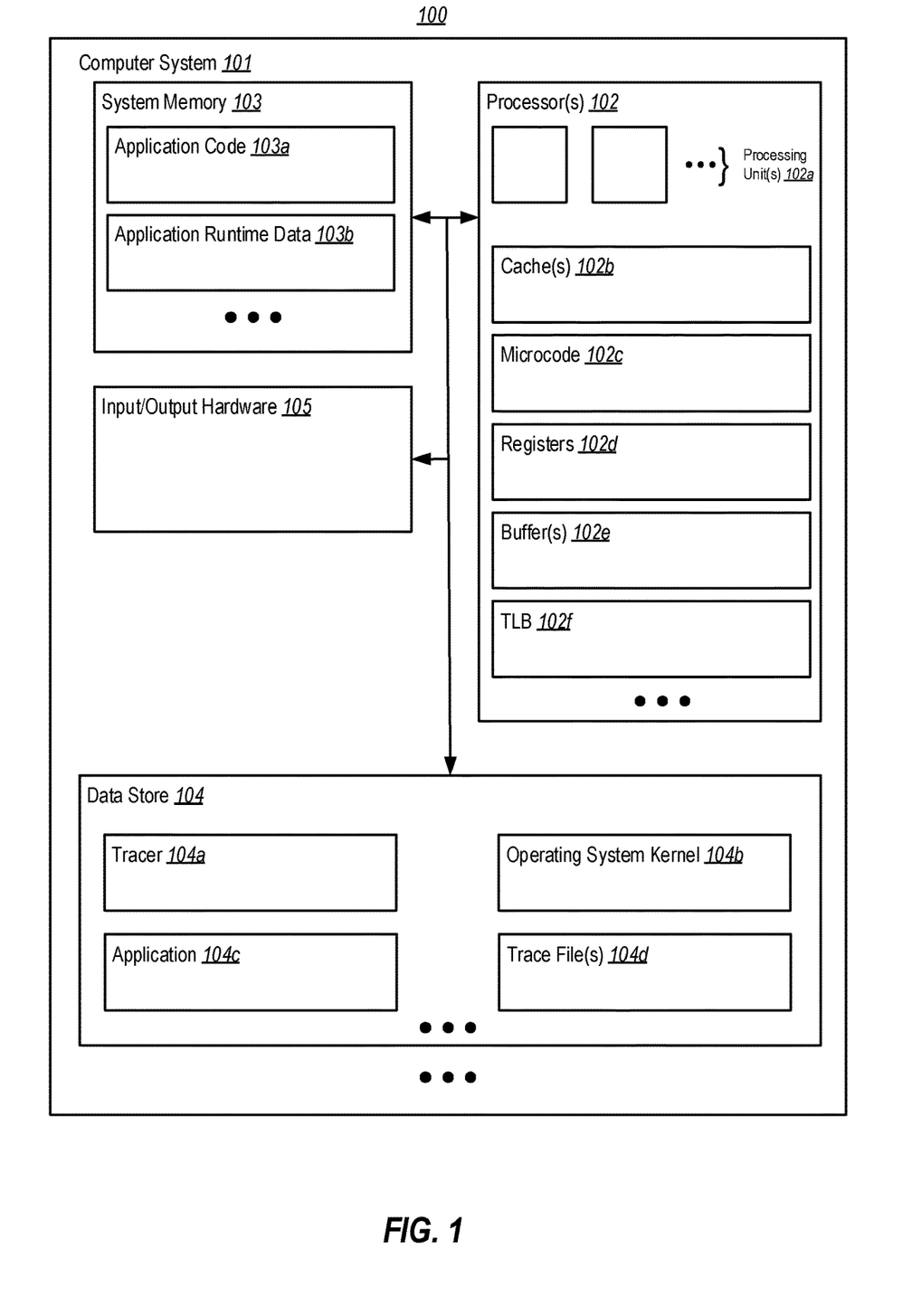
FIG. 1 illustrates an example computing environment that facilitates recording "bit-accurate" traces of execution across a plurality of processing units, using at least two tiers or layers of processor caches—including detecting an influx to an inner or "lower-layer" processor cache, and using an outer or "upper-layer" shared processor cache to determine if that influx can be logged by reference to a previously-logged value.

FIG. 1 illustrates an example computing environment 100 that facilitates recording "bit-accurate" traces of execution across a plurality of processing units, using at least two tiers or layers of processor caches—including detecting an influx to an inner or "lower-layer" processor cache, and using an outer or "upper-layer" shared processor cache to determine if that influx can be logged by reference to a previously-logged value. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the data store 104 can store computer-executable instructions and/or data structures representing application programs such as, for example, a tracer 104*a*, an operating system kernel 104*b*, and application 104*c* (e.g., the application that is the subject of tracing by the tracer 104*a*, and one or more trace file(s) 104*d*). When these programs are executing (e.g., using the processor(s) 102), the system memory 103 can store corresponding runtime data, such as runtime data structures, computer-executable instructions, etc. Thus, FIG. 1 illustrates the system memory 103 as including runtime application code 103*a* and application runtime data 103*b* (e.g., each corresponding with application 104*c*).

The tracer 104*a* is usable to record a bit-accurate trace of execution of an application, such as application 104*c*, and to store trace data in the trace file(s) 104*d*. In some embodiments, the tracer 104*a* is a standalone application, while in other embodiments the tracer 104*a* is integrated into another software component, such as the operating system kernel 104*b*, a hypervisor, a cloud fabric, etc. While the trace file(s) 104*d* are depicted as being stored in the data store 104, the trace file(s) 104*d* may also be recorded exclusively or temporarily in the system memory 103, or at some other storage device. As clarified later, the tracer 104*a* may interoperate with specific features of the processor(s) 102 that enable tracing utilizing the processor's cache coherence protocol (CCP).

FIG. 1 includes a simplified representation of the internal hardware components of the processor(s) 102. As illustrated, each processor 102 includes a plurality of processing unit(s) 102*a*. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102*a* presented by that single physical processing unit.

Each processing unit 102*a* executes processor instructions that are defined by applications (e.g., tracer 104*a*, operating kernel 104*b*, application 104*c*, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102*a* obtains processor instructions from one or more processor cache(s) 102*b*, and executes the processor instructions based on data in the cache(s) 102*b*, based on data in registers 102*d*, and/or without input data. In general, each cache 102*b* is a small amount (i.e., small relative to the typical amount of system memory 103) of random-access memory that stores on-processor copies of portions of a backing store, such as the system memory 103 and/or another cache in the cache(s) 102*b*. For example, when executing the application code 103*a*, one or more of the cache(s) 102*b* contain portions of the application runtime data 103*b*. If the processing unit(s) 102*a* request data not already stored in a particular cache 102*b*, then a "cache miss" occurs, and that data is fetched from the system memory 103 or another cache, potentially "evicting" some other data from that cache 102*b*.

Figure 2A:
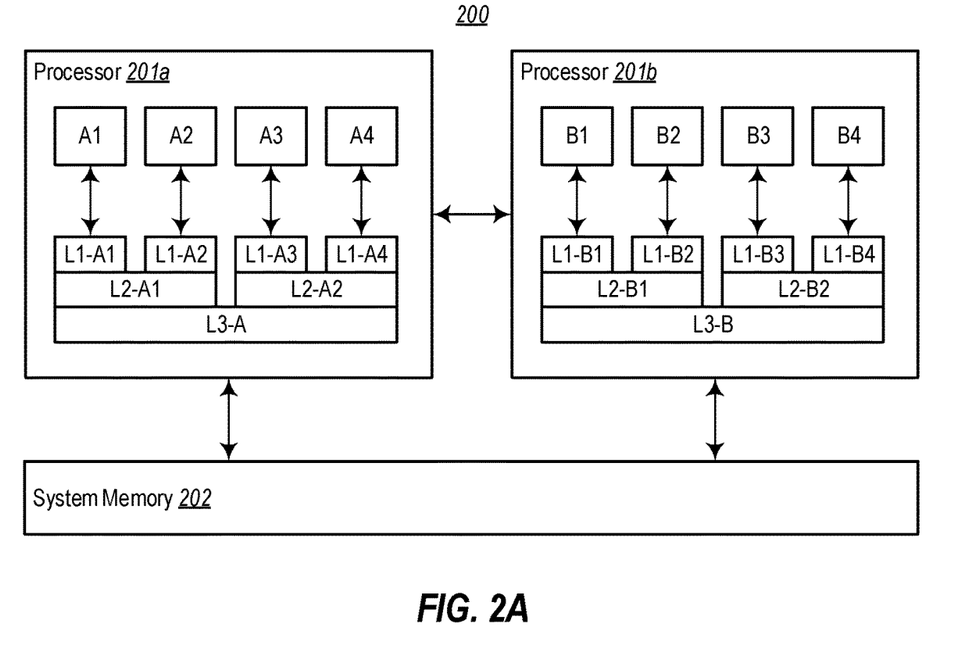
FIG. 2A illustrates an example computing environment including multi-layer caches.

Often times, the processor cache(s) 102b are divided into separate tiers, layers, or levels—such as layer 1 (L1), layer 2 (L2), layer 3 (L3), etc. Depending on processor implementation, tiers could be part of the processor 102, itself (e.g., L1 and L2), and/or could be separate from the processor 102 (e.g., L3). Thus, the cache(s) 102b of FIG. 1 may comprise one of these layers (L1) or may comprise a plurality of these layers (e.g., L1 and L2, and even L3). FIG. 2A illustrates an example environment 200 demonstrating multi-layer caches. In FIG. 2A, there are two processors 201a and 201b (e.g., each corresponding to a different processor 102 of FIG. 1) and a system memory 202 (e.g., corresponding to system memory 103 of FIG. 1). In the example environment 200, each processor 201 includes four physical processing units (i.e., units A1-A4 for processor 201a and units B1-B4 for processor 210b).

Example environment 200 also includes a three-layer cache within each processing unit 201. Environment 200 is one example layout only, and it not limiting to the cache hierarchies in which the embodiments herein may operate. In environment 200, at a lowest or most inner layer each processing unit is associated with its own dedicated L1 cache (e.g., L1 cache "L1-A1" in processor 201a for unit A1, L1 cache "L1-A2" in processor 201a for unit A2, etc.). Moving up a layer, each processing unit 201 includes two L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, at the highest or most outer layer, each processing unit 201 includes a single L3 cache (e.g., L3 cache "L3-A" in processor 201a that serves as a backing store for L2 caches L2-A1 and L2-A2, and L3 cache "L3-B" in processor 201b that serves as a backing store for L2 caches L2-B1 and L2-B2). As shown, system memory 202 serves as a backing store for the L3 caches L3-A and L3-B.

As demonstrated in FIG. 2A, when multiple cache layers are used, the processing unit(s) 102a typically interact directly with the lowest layer (L1). In most cases, data flows between the layers (e.g., on a read an L3 cache interacts with the system memory 103 and serves data to an L2 cache, and the L2 cache in turn serves data to the L1 cache). When a processing unit 102a performs a write, the caches coordinate to ensure that those caches that have affected data that was shared among the processing unit(s) 102a don't have it anymore. This coordination is performed using a CCP.

The caches in environment 200 may thus be viewed as "shared" caches. For example, each L2 and L3 cache serves multiple processing units within a given processor 201 and are thus shared by the processing units. The L1 caches within a given processor 201, collectively, can also be considered shared—even though each one corresponds to a single processing unit—because the individual L1 caches may coordinate with each other (i.e., via a CCP) to ensure consistency (i.e., so that each cached memory location is viewed consistently across all the L1 caches). The L2 caches within each processor 201 similarly may coordinate via a CCP. Additionally, if the processor 201 supports hyper-threading, each individual L1 cache may be viewed being shared by two or more logical processing units and are thus "shared" even at an individual level.

Figure 2B:
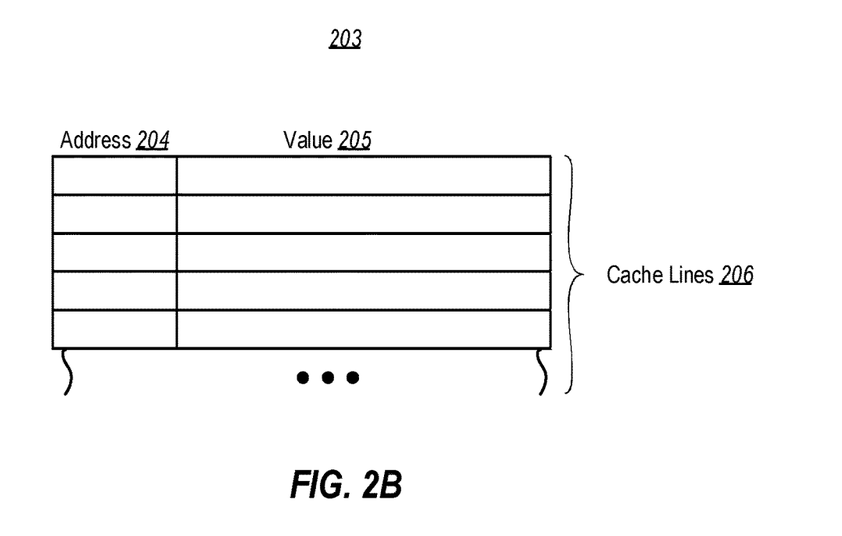
FIG. 2B illustrates an example of a cache.

Typically, each cache comprises a plurality of "cache lines." Each cache line stores a chunk of memory from its backing store (e.g., system memory 202 or a higher-layer cache). For example, FIG. 2B illustrates an example of at least a portion of a cache 203, which includes a plurality of cache lines 206, each of which comprises at least an address portion 204 and a value portion 205. The address portion 204 of each cache line 206 is configured to store an address in system memory 202 for which the cache line corresponds, and the value portion 205 initially stores a value received from the system memory 202. The value portion 205 can be modified by the processing units, and eventually be evicted back to the backing store. As indicated by the ellipses, a cache 203 can include a large number of cache lines. For example, a contemporary 64-bit INTEL processor may contain individual L1 caches comprising 512 or more cache lines. In such a cache, each cache line is typically usable to store a 64-byte (512-bit) value in reference to a 6-byte (48-bit) to 8-byte (64-bit) memory address. As visually indicated in FIG. 2A, cache sizes typically increase with each layer (i.e., L2 caches are typically larger than L1 caches, L3 caches are typically larger than L2 caches, etc.).

The address stored in the address portion 204 of each cache line 206 may be a physical address, such as the actual memory address in the system memory 202. Alternatively, the address stored in the address portion 204 may be a virtual address, which is an address that is mapped to the physical address to provide an abstraction (e.g., using operation-system managed page tables). Such abstractions can be used, for example, to facilitate memory isolation between different processes executing at the processor(s) 102, including isolation between user-mode processes and kernel mode processes associated with the operating system kernel 104b. When virtual addresses are used, a processor 102 may include a translation lookaside buffer (TLB) 102f (usually part of a memory management unit (MMU)), which maintains recently-used memory address mappings between physical and virtual addresses.

The cache(s) 102b may include code cache portions and data cache portions. When executing the application code 103a, the code portion(s) of the cache(s) 102b may store at least a portion of the processor instructions stored in the application code 103a and the data portion(s) of the cache(s) 102b may store at least a portion of data structures of the application runtime data 103b. In addition, caches can be inclusive, exclusive, or include both inclusive and exclusive behaviors. For example, in an inclusive cache an L3 layer would store a superset of the data in the L2 layers below it, and the L2 layers store a superset of the L1 layers below them. In exclusive caches, the layers may be disjointed—for example, if data exists in an L3 cache that an L1 cache needs, they may swap information, such as data, address, and the like.

Retuning to FIG. 1, each processor 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 is typically embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the cache(s) 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiments, processors 102 may also include control registers, which are used to control different aspects of processor operation. Although FIG. 1 depicts registers 102d as a single box, it will be appreciated that each processing unit 102a typically includes one or more corresponding sets of registers 102d that are specific to that processing unit.

In some embodiments, the processor(s) 102 may include one or more buffers 102e. As will be discussed herein after, buffer(s) 102e may be used as a temporary storage location for trace data. Thus, for example, the processors(s) 102 may store portions of trace data the buffer(s) 102e, and flush that data to the trace file(s) 104d at appropriate times, such as when there is available memory bus bandwidth and/or free processor cycles.

As alluded to above, processors operate on the cache(s) 102b according to one or more CCPs. In general, a CCP defines how consistency is maintained between data among the various cache(s) 102b as the various processing units 102a read from and write to data in the various cache(s) 102b, and how to ensure that the various processing units 102a always read valid data from a given location in the cache(s) 102b. CCPs are related to an enable a memory model defined by the processor 102's ISA.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the cache(s) 102b. A "modified" cache location contains data that has been modified in the cache(s) 102b and is therefore potentially inconsistent with the corresponding data in the backing store (e.g., system memory 103 or another cache). When a location having the "modified" state is evicted from the cache(s) 102b, common CCPs require the cache to guarantee that its data is written back the backing store, or that another cache take over this responsibility. A "shared" cache location contains data that is unmodified from the data in the backing store, exists in read-only state, and is shared by the processing unit(s) 102a. The cache(s) 102b can evict this data without writing it to the backing store. An "invalid" cache location contains no valid data and can be considered empty and usable to store data from cache miss. An "exclusive" cache location contains data that matches the backing store and is used by only a single processing unit 102a. It may be changed to the "shared" state at any time (i.e., in response to a read request) or may be changed to the "modified" state when writing to it. An "owned" cache location is shared by two or more processing units 102a, but one of the processing units has the exclusive right to make changes to it. When that processing makes changes, it notifies the other processing units—since the notified processing units may need to invalidate or update based on the CCP implementation.

As alluded to, embodiments utilize the processor 102's cache(s) 102b to efficiently record a bit-accurate trace of execution of an application 104c and/or the operating system kernel 104b. These embodiments are built upon an observation by the inventor that the processor 102 (including the cache(s) 102b) form a semi- or quasi-closed system. For example, once portions of data for a process (i.e., code data and runtime application data) are loaded into the cache(s) 102b, the processor 102 can run by itself—without any input—as a semi- or quasi-closed system for bursts of time. In particular, once the cache(s) 102b are loaded with data, one or more of the processing units 102a execute instructions from the code portion(s) of the cache(s) 102b, using runtime data stored in the data portion(s) of the cache(s) 102b and using the registers 102d.

When a processing unit 102a needs some influx of information (e.g., because an instruction it is executing, will execute, or may execute accesses code or runtime data not already in the cache(s) 102b), a "cache miss" occurs and that information is brought into the cache(s) 102b from the system memory 103. For example, if a data cache miss occurs when an executed instruction performs a memory operation at a memory address within the application runtime data 103b, data from that memory address is brought into one of the cache lines of the data portion of the cache(s) 102b. Similarly, if a code cache miss occurs when an instruction performs a memory operation at a memory address application code 103a stored in system memory 103, code from that memory address is brought into one of the cache lines of the code portion(s) of the cache(s) 102b. The processing unit 102a then continues execution using the new information in the cache(s) 102b until new information is again brought into the cache(s) 102b (e.g., due to another cache miss or an un-cached read).

The inventor has also observed that, in order to record a bit-accurate representation of execution of an application, the tracer 104a can record sufficient data to be able to reproduce the influx of information into the cache(s) 102b as processing units execute that application's thread(s). For example, one approach to recording these influxes operates on a per-processing-unit basis and at the innermost cache layer (e.g., L1). This approach may involve recording, for each processing unit that is being traced, all cache misses and un-cached reads (i.e., reads from hardware components and un-cacheable memory) associated with that processing unit's L1 cache, along with a time during execution at which each piece of data was brought into that processing unit's L1 cache (e.g., using a count of instructions executed or some other counter). If there are events that can be ordered across the processing units (e.g., accesses to shared memory), these events can be logged across the resulting data streams (e.g., by using a monotonically incrementing number (MIN) across the data streams).

However, because an L1 cache layer may include multiple distinct L1 caches that are each associated a different physical processing unit (e.g., as shown in FIG. 2A), recording in this manner may record duplicate data—and thus more data than is strictly necessary for a "full-fidelity" trace. For example, if multiple physical processing units read from the same memory location (which may be a frequent occurrence in multi-threaded applications) this approach may log cache misses for the same memory location and data for each of multiple physical processing units. Notably, as used herein, a "full-fidelity" trace is any trace that contains sufficient information to enable a full replay of a traced entity—even though a particular "full-fidelity" trace may actually contain less data that encapsulated the same information than might be recorded using alternate tracing techniques.

In order to further reduce trace file size, the inventor has developed improved recording techniques that utilize one or more of the upper-layer caches to avoid recording at least a portion of this duplicate data. Instead, these improved techniques can log by reference to previously-logged data. In particular, embodiments detect an influx (i.e., cache miss) to an inner or "lower-layer" processor cache (e.g., L1) based on activity by one processing unit, but then use one or more outer or "upper-layer" shared processor cache(s) to log that that influx by reference to an influx already logged on behalf of another traced processing unit, when possible.

In order to understand these techniques, it is noted that that, in most environments, an upper-layer cache is larger than lower-layer caches below it, and it frequently is a backing store for multiple lower-layer caches. For example, in the example environment of FIG. 2A, each L2 cache is a backing store for two L1 caches, and each L3 cache is a backing store for two L2 caches (and, by extension, four L1 caches). Thus, an upper-layer cache can retain knowledge about multiple lower-layer caches (e.g., in FIG. 2A, L2 cache L1-A1 can retain knowledge about L1 caches L1-A1 and L1-A2, L2 cache L1-A2 can retain knowledge about L1 caches L1-A3 and L1-A4, and L3 cache L3-A can retain knowledge about L2 caches L2-A1 and L2-A1 as well as L1 caches L1-A1, L1-A2, L1-A3, and L1-A4). By utilizing the knowledge of one or more upper cache layers, the embodiments herein and enable many opportunities for logging influxes caused by one processing unit by reference to an influx already logged on behalf of another processing units.

Figure 3:
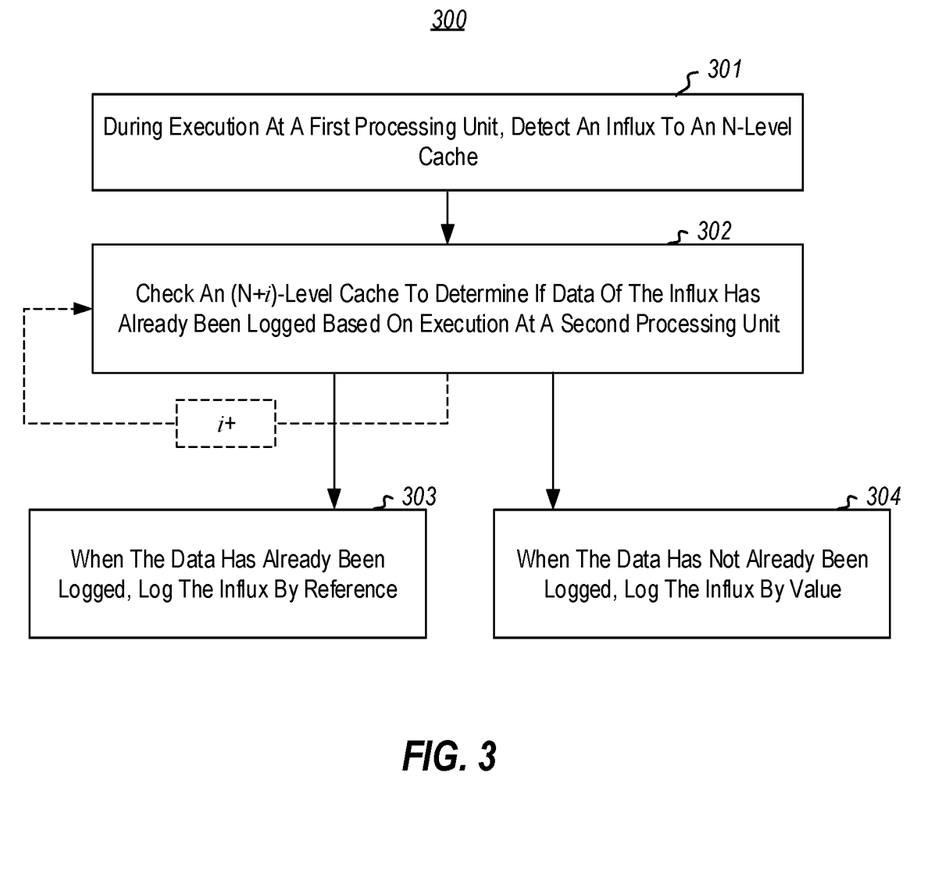
FIG. 3 illustrates a flowchart of an example method for trace recording based on recording an influx to a lower-level cache by reference to prior log data based on knowledge of one or more upper-level caches.

In accordance with these embodiments, FIG. 3 illustrates an example of a method 300 for trace recording based on recording an influx to a lower-level cache by reference to prior log data based on knowledge of one or more upper-level caches. FIG. 3 is now described in the context of FIGS. 1 and 2.

In particular, FIG. 3 operates in environments, such as a processor 102 or 201a that includes a plurality of processing units, a plurality of N-level caches, and an (N+i)-level cache that is associated with two or more of the plurality of N-level caches, and that is configured as a backing store for the plurality of N-level caches. In method 300 (and in the claims), N and i are positive integers—i.e., N≥1, such that N equals 1, 2, 3, etc.; and i≥1, such that i equals 1, 2, 3, etc. For example, referring to processor 201a of FIG. 2A, the processor includes a plurality of processing units A1, A2, etc. The processor 201a also includes a plurality of N-level caches L1-A1, L1-A2, etc. (i.e., where N equals 1). The processor 201a also includes an (N+i)-level cache that is associated with two or more of the plurality of N-level caches, and that is configured as a backing store for the plurality of N-level caches. For example, processor 201a includes an (N+i)-level cache L2-A1 that is a backing store for N-level caches L1-A1 and L1-A2 (i.e., where N equals 1, and i equals 1). In another example, processor 201a includes an (N+i)-level cache L3-A that is a backing store for N-level caches L1-A1, L1-A2, etc. (i.e., where N equals 1, and i equals 2). Processor 102/201a operates method 300 based on control logic, such as microcode 102c and/or circuit logic.

As shown, method 300 includes an act 301 of, during execution at a first processing unit, detecting an influx to an N-level cache. In some embodiments, act 301 comprises detecting an influx to a first N-level cache of plurality of N-level caches, the influx comprising data stored at a memory location. For example, based on activity by processing unit A1, such as a requested memory access to system memory 202 (e.g., resulting from normal or speculative execution of a first thread of application 104c), a cache miss may occur in cache L1-A1 (i.e., when N equals 1). As such, a line of cache L1-A1 obtains an influx of data, including the then-current value of requested memory location. Depending on cache attributes (e.g., what upper-level layers exist, whether the cache architecture is inclusive or exclusive, etc.) and current cache state, an influx could be sourced from system memory 202 or from a higher-level cache (e.g., L2-A1 and/or L3-A).

Method 300 also includes an act 302 of checking an (N+i)-level cache to determine if data of the influx has already been logged based on execution at a second processing unit. In some embodiments, act 302 comprises, based on detecting the influx to the first N-level cache, checking the (N+i)-level cache to determine if the data for the memory location has been previously logged on behalf of a second processing unit. For example, if i equals 1—such that the (N+i)-level cache comprises an (N+1)-level cache—then processor 201 may check an L2 cache, such as L2-A1 (which has knowledge of cache L1-A2 and processing unit A2). This check can be used to determine if the data for the memory location had previously been logged on behalf of processing unit A2. This data may have been previously logged, for example, based on prior execution of a second thread of application 104c at processing unit A2 that caused a cache miss in cache L1-A2. In an alternate example, if i equals 2—such that the (N+i)-level cache comprises an (N+2)-level cache—then processor 201 may check an L2 cache, such as cache L3-A (which has knowledge of all the other caches in processor 201). This check can be used to determine if the data for the memory location had previously been logged on behalf of any of processing units A2-A4 (e.g., based on prior execution of one or more other thread(s) of application 104c at one or more of processing units A2-A4 that caused cache miss(es) in caches L1-A2, L1-A3, and/or L1-A4). Note that in this second example, the L2 cache may be skipped in the check.

As shown, act 302 could be repeated any number of times, while incrementing the value of i each time. While i would typically be incremented by 1 each time, there could be embodiments that increment it by a positive integer that is greater than 1. The effect of repeating act 302 is while incrementing i is to check multiple upper-level caches. For example, if i=1, then when act 302 is initially run processor 201 may check an L2 cache layer (e.g., L2-A1 and/or L2-A2). If insufficient knowledge about the applicable memory location is found in the L2 cache, then processor 201 may repeat act 302 with i=2, thereby checking an L3 cache layer (e.g., L3-A). This could be continued for as many levels of caches as the computing environment provides. If i is ever incremented by a value greater than 1, then one or more cache layer(s) could be skipped along the way. It will be appreciated that it could be beneficial to check multiple cache levels in architectures that provide exclusive caches or that provide caches that exhibit hybrid inclusive/exclusive behaviors. This is because in these architectures there may be no guarantee that an outer cache layer contains a full superset of the data in the inner cache layer(s).

In view of the foregoing, it will be appreciated that method 300 can operate in environments, such as a processor 102 or 201a, in which i equals 1, such that the (N+i)-level cache comprises an (N+1)-level cache, and which the processor also comprises an (N+2)-level cache that is configured as a backing store for the (N+1)-level cache. In these environments, checking the (N+1)-level cache to determine if the data for the memory location has been previously logged on behalf of the second processing unit (i.e., act 302) can comprise determining that no cache line in the (N+1)-level cache corresponds to the memory location. Further, checking the (N+2)-level cache to determine if the data for the memory location has been previously logged on behalf of the second processing unit.

As shown, based on the outcome of act 302, method includes an act 303 of, when the data has already been logged, logging the influx by reference; or an act 304 of, when the data has not already been logged, logging the influx by value.

In some embodiments, act 303 comprises, when the data for the memory location has been previously logged on behalf of the second processing unit, causing the data for the memory location to be logged on behalf of the first processing unit by reference to log data that was previously logged on behalf of the second processing unit. Continuing the examples above, for instance, if a check of (N+1)-level cache L2-A1 and/or a check of (N+2)-level cache L3-A results in a determination that the data/memory location was already logged on behalf of processing unit A2 (based on an influx to cache L1-A2), then the processor 201a can cause the influx to cache L1-A1 to be logged on behalf of processing unit A1 by reference to the log entry made for processing unit A2. Examples of how logging by reference might be accomplished are given later.

Turning to the alternative outcome of act 302, in some embodiments, act 304 comprises, when the data for the memory location has not been previously logged on behalf of the second processing unit, causing the data for the memory location to be logged by value on behalf of the first processing unit. For example, if a check of (N+1)-level cache L2-A1 and/or a check of (N+2)-level cache L3-A results in a determination that the data/memory location has not already logged on behalf of another processing unit, then the processor 201a can cause the influx to cache L1-A1 to be logged by value of behalf of processing unit A1. Logging by value can include, for example, logging the memory address and the memory value in a data packet for processing unit A1. Note that logging by value can include any number of compression techniques to reduce the number of bits needed to accomplish the actual logging.

As was described in connection with FIG. 1, processor(s) 102 can include buffer(s) 102d that can be used for temporarily storing trace data. Thus, in method 300, "causing" different types of data to be logged could comprise the processor 102 storing such data into the buffer(s) 102d. Additionally, or alternatively, it could include the processor 102 communicating such data to the tracer 104a, writing such data to the trace file(s) 104d, and/or notifying the tracer 104a that the data is available in the buffer(s) 102d. In some embodiments, the buffer(s) 102d could comprise one or more reserved portions of the cache(s) 102b. Thus, using buffers 102d, in acts 304/304 causing the data for the memory location to be logged—either by reference or by value—on behalf of the first processing unit can comprise delaying the logging based on availability of resources such as processor cycles, memory locations, bus bandwidth, etc. In embodiments in which the buffer(s) 102d comprise one or more reserved portions of the cache(s) 102b, the delayed logging could comprise invalidating a cache line (in the N-level cache and/or the (N+i)-level cache), rather than evicting it, in order to retain the data for the memory location for purposes of delayed logging.

The description of method 300 has referred to upper-layer caches having "knowledge" about lower-layer caches. The particular form of the "knowledge" that an upper-layer cache retains about lower-level caches can vary, and examples now follow.

In a basic form, this "knowledge" could be the mere presence of a cache line in an upper-level cache that corresponds to cache line(s) in lower-level cache(s) (i.e., cache lines corresponding to the same memory location and memory data). As mentioned above, in inclusive caches the upper layer(s) store a superset of the data in the layer(s) below them. For example, suppose the caches in FIG. 2A are inclusive. In this case, when activity by processing unit A2 causes a location from system memory 202 to be imported into cache L1-A2, that same memory location is also cached in caches L2-A1 and L3-A. If activity of processing unit A2 is being traced, embodiments may cause the memory location and its value to be logged on behalf of processing unit A2. Later, if activity by processing unit A1 causes that same location from system memory 202 to be imported into cache L1-A1, and that location still stores the same data, it is served from cache L2-A1, since cache L2-A1 already has the data. Prior techniques may again log this data for processing unit A1 based on it being an influx to cache L2-A1. However, embodiments herein may instead recognize that the memory location and its value already existed in cache L2-A1, and thus already existed in cache L1-A2. Because processing unit A2 is being logged, embodiments may recognize that the memory location and its value would have already been logged on behalf of processing unit A2, and therefore cause this new activity of processing unit A1 to be logged in reference to the log data previously recorded on behalf of processing unit A2.

Figure 4A:
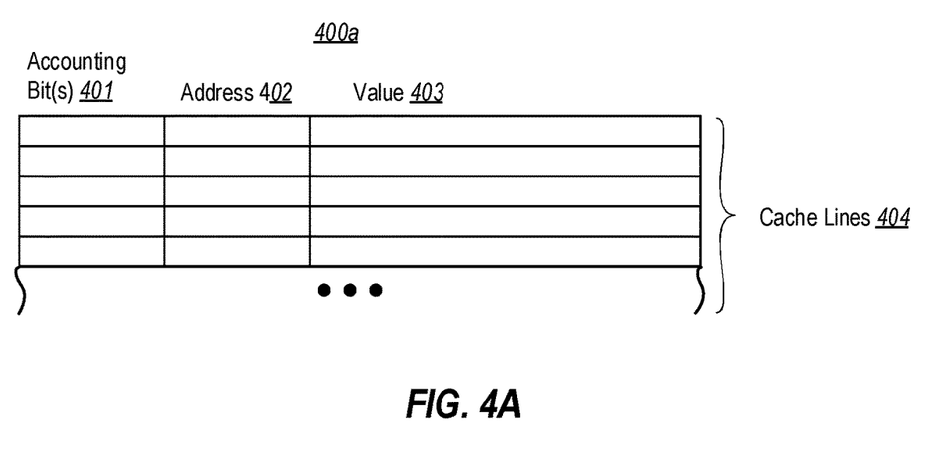
FIG. 4A illustrates an example shared cache that extends each of its cache lines with one or more additional accounting bits.

More elaborate forms of "knowledge" by an upper-layer cache are also possible. For example, embodiments may extend the cache lines in one or more cache layers with additional "accounting" (or logging) bits that enable the processor 102 to identify, for each cache line that implements accounting bits, whether that cache line has been logged (potentially with the identity of processing unit(s) that logged the cache line). In order to understand these concepts, FIG. 4A illustrates an example shared cache 400a, similar to the shared cache 203 of FIG. 2B, that extends each of its cache lines 404 with one or more additional accounting bit(s) 401. Thus, each cache line 404 includes accounting bit(s) 401, conventional address bits 402, and value bits 403.

Figure 4B:
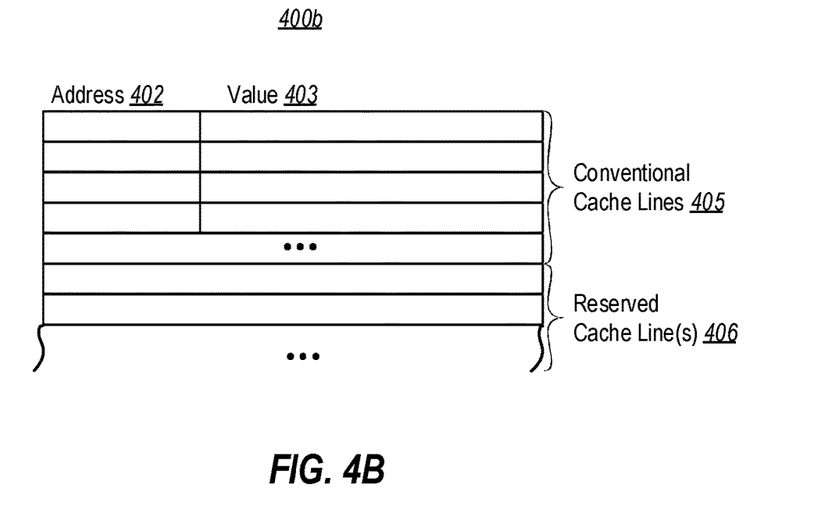
FIG. 4B illustrates an example of a shared cache that includes one or more reserved cache lines for storing accounting bits that apply to conventional cache lines.

Alternatively, FIG. 4B illustrates an example of a shared cache 400b that includes conventional cache lines 405 that store memory addresses 402 and values 403, as well as one or more reserved cache line(s) 406 for storing accounting bits that apply to the conventional cache lines 405. The bits of the reserved cache line(s) 406 are allocated into different groups of accounting bits that each corresponds to a different one of the conventional cache lines 405.

In a variation of the example FIG. 4B, the reserved cache line(s) 406 could be reserved as one (or more) ways in each index of a set-associative cache (which are discussed in more detail later). For example, in an 8-way set-associative cache one way in a set could be reserved for accounting bits that apply to the other seven ways in the set. This can decrease the complexity of implementing reserved cache lines and can speed access to the reserved cache lines since all ways in a given set are typically read in parallel by most processors.

Regardless of how the accounting bits are actually stored, each cache line's accounting bit(s) 401 could comprise one or more bits that function as a flag (i.e., on or off) used by the processor(s) 102 to indicate whether or not the present value in the cache line was logged on behalf of a processing unit (or, alternatively, consumed by a processing unit that participates in logging). Thus, the check in act 302 can include using this flag to determine if the cache line has been logged by a processing unit that participates in logging.

Alternately, each cache line's accounting bits 401 could comprise a plurality of bits. Pluralities of bits could be used in several ways. Using one approach, referred to herein as "unit bits," each cache line's accounting bits 401 can include a number of unit bits equal to a number of processing units 102a of the processor 102 (e.g., the number of logical processing units if the processor 102 supports hyper-threading or the number of physical processing unit if hyper-threading is not supported). These unit bits can be used by the processor 102 to track which one or more particular processing unit(s) have logged the cache line (if any). Thus, for example, a cache that is shared by two processing units 102a could associate two unit bits with each cache line.

In another approach to using pluralities of accounting bits 401, referred to herein as "index bits," each cache line's accounting bits 401 can include a number of index bits sufficient to represent an index to each of the processing units 102a of a processor 102 of computer system 101 that participate in logging, potentially along with a "reserved" value (e.g., −1). For example, if the processor 102 includes 128 processing units 102a, these processing units can be identified by an index value (e.g., 0-127) using only seven index bits per cache line. In some embodiments, one index value is reserved (e.g., "invalid") to indicate that no processor has logged a cache line. Thus, this would mean that the seven index bits would actually be able to represent 127 processing units 102a, plus the reserved value. For example, binary values 0000000-1111110 might correspond to index locations 0-126 (decimal), and binary value 1111111 (e.g., −1 or 127 decimal, depending on interpretation) might correspond to "invalid," to indicate that no processor has logged the corresponding cache line—though this notation could vary, depending on implementation. Thus, unit bits can be used by the processor 102 to indicate if the cache line has been logged (e.g., a value other than −1), and as an index to a particular processing unit that logged the cache line (e.g., the processing unit that most recently consumed it). This second approach to using pluralities of accounting bits 401 has the advantage of supporting a great number of processing units with little overhead in the cache 102b, with the disadvantage of less granularity than the first approach (i.e., only one processing unit is identified at a time).

In view of the foregoing, it will be appreciated that, in act 302, checking the (N+i)-level cache to determine if the data for the memory location has been previously logged on behalf of the second processing unit could comprise determining if a cache line in the (N+i)-level cache that corresponds to the memory location has one or more accounting bits set.

Another mechanism that can be used to determine whether a cache line has been logged is to utilize set-associative caches and way-locking. Since a processor's cache 102b is generally much smaller than system memory 103 (often by orders of magnitude), thus there are usually far more memory locations in the system memory 103 than there are lines in any given layer of the cache 102b. As such, some processors define mechanisms for mapping multiple memory locations of system memory to line(s) one or more cache layers. Processors generally employ one of two general techniques: direct mapping and associative (or set-associative) mapping. Using direct mapping, different memory locations in system memory 103 are mapped to just one line in a cache layer, such that each memory location can only be cached into a particular line in that layer.

Figure 5:
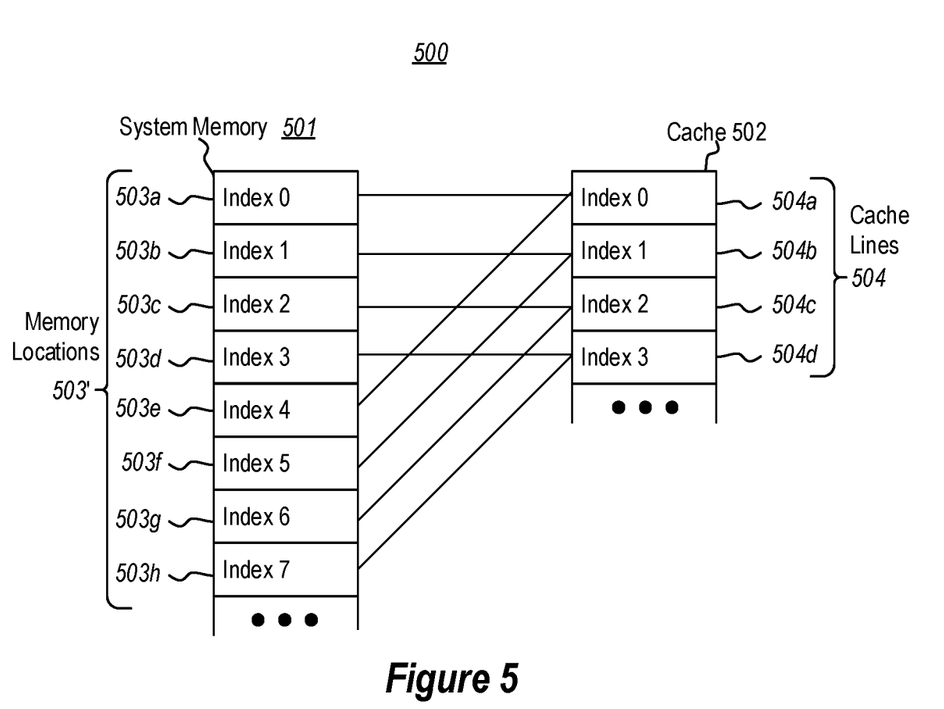
FIG. 5 illustrates an example of set-associative mapping between system memory and a cache.

Using set-associative mapping, on the other hand, different locations in system memory 103 can be cached to one of multiple lines in a cache layer. FIG. 5 illustrates an example 500 of set-associative mapping between system memory and a cache. Here, cache lines 504 of a cache layer 502 are logically partitioned into different sets of two cache lines each, including a first set of two cache lines 504a and 504b (identified as index 0), and a second set of two cache lines 504c and 504d (identified as index 1). Each cache line in a set is identified as a different "way," such that cache line 504a is identified by index 0, way 0, cache line 504b is identified by index 0, way 1, and so on. As further depicted, memory locations 503a, 503c, 503e, and 503g (memory indexes 0, 2, 4, and 6) are mapped to index 0. As such, each of these locations in system memory can be cached to any cache line within the set at index 0 (i.e., cache lines 504a and 504b). The particular patterns of the depicted mappings are for illustrative and conceptual purposes only, and should not be interpreted as the only way in which memory indexes can be mapped to cache lines.

Set-associative caches are generally referred to as being N-way set-associative caches, where N is the number of "ways" in each set. Thus, the cache 500 of FIG. 5 would be referred to as a 2-way set-associative cache. Processors commonly implement N-way caches where N is a power of two (e.g., 2, 4, 8, etc.), with N values of 4 and 8 being commonly chosen (though the embodiments herein are not limited to any particular N-values or subsets of N-values). Notably, a 1-way set-associative cache is generally equivalent to a direct-mapped cache, since each set contains only one cache line. Additionally, if N equals the number of lines in the cache, it is referred to as a fully associative cache, since it comprises a single set containing all lines in the cache. In fully associative caches, any memory location can be cached to any line in the cache.

It is noted that FIG. 5 represents a simplified view of system memory and caches, in order to illustrate general principles. For example, while FIG. 5 maps individual memory locations to cache lines, it will be appreciated that each line in a cache may store data relating to multiple addressable locations in system memory. Thus, in FIG. 5, each location (503a-503h) in system memory (501) may actually represent a plurality of addressable memory locations. Additionally, mappings may be between actual physical addresses in the system memory 501 and lines in the cache 502, or may use an intermediary layer of virtual addresses.

Set-associative caches can be used for determining whether a cache line has been logged through use of way-locking. Way-locking locks or reserves one or more ways in a cache for some purpose. In particular, the embodiments herein utilize way-locking to reserve one or more ways for a processing unit that is being traced, such that the locked/reserved ways are used exclusively for storing cache misses relating to execution of that unit. Thus, referring back to FIG. 5, if "way 0" were locked for a traced processing unit, then cache lines 504a and 504c (i.e., index 0, way 0 and index 1, way 0) would be used exclusively for cache misses relating to execution of that unit, and the remaining cache lines would be used for all other cache misses. Thus, in order to determine whether a particular cache line has been logged, the processor 102 need only determine whether the cache line stored in an "N+1" cache layer is part of a way is has been reserved for a traced processing unit.

In view of the foregoing, it will be appreciated that, in act 302, checking the (N+i)-level cache to determine if the data for the memory location has been previously logged on behalf of the second processing unit could comprise determining if a cache line in the (N+i)-level cache that corresponds to the memory location is stored in a way that corresponds to a logged processing unit.

As was explained earlier, caches operate according to a CCP, which defines how consistency is maintained among various caches as the processing units read from and write to cache data, and how to ensure that the processing units always read valid data from a given location in a cache. As such, in connection with operating a cache, a processor 102 maintains and stores CCP state data. The granularity with which different processors and/or different CCPs track cache coherence state and make that cache coherence data available to a tracer 104a can vary. For example, at one end of the spectrum, some processors/CCPs track cache coherence per cache line as well as per processing unit. These processors/CCPs can, therefore, track the state of each cache line as it relates to each processing unit. This means that a single cache line can have information about its state as it relates to each processing unit 102a. Other processors/CCPs are less granular, and track cache coherence the level of the cache line only (and lack per-processing unit information). At the other end of the spectrum, processor manufacturers may choose to track cache coherence at the level of the cache line only for efficiency, since only one processor can own a line exclusively (exclusive, modified, etc.) at a time. As a mid-granularity example, a processor/CCP may track cache coherence per cache line, as well as an index (e.g., 0, 1, 2, 3 for a four-processing unit processor) to the processing unit that has the current cache line state.

Whatever the granularity with which CCP state data is maintained at a given processor, this CCP state data can be included in the "knowledge" that an (N+i)-level cache has about cached data. In particular, the CCP state data associated with a given cache line in an (N+i)-level cache can be used to determine if that cache line has been logged by one of the processing units. For example, if the CCP state data indicates that a particular processing unit has taken a given cache line as "shared," this data can, in turn, be used to determine that the processing unit has logged a read from the cache line. Thus, it will be appreciated that, in act 302, checking the (N+i)-level cache to determine if the data for the memory location has been previously logged on behalf of the second processing unit could comprise determining if a cache line in the (N+i)-level cache that corresponds to the memory location has associated CCP state data that is usable to determine that the cache line has been logged.

In act 303, an influx of data may be logged by reference to previously-logged data (typically data logged by a different processing unit that the one that caused the present influx). Logging by reference can be accomplished using one or more of a variety of methods (including combinations thereof), some of which are now described.

A first method logs by reference to a previously-logged memory address. For example, suppose processing unit A2 in FIG. 2A has logged data that represents a particular memory address (i.e., in system memory 202) and particular data stored at that memory address. Later, if that particular memory address/particular data is an influx for processing unit A1, processing unit A1 could store a log entry that identifies the (i) particular memory address and (ii) processing unit A2. Here, processing unit A1 has avoided re-logging the actual data stored at the memory address (which can be of considerable size). Some variants of this first method could also store ordering data, such as a MIN from a series that increments across the data streams for processing units A1 and A2. This MIN can later be used to order this is influx by processing unit A1 against one or more events at processing unit A2 (e.g., those that are also associated with a MIN from the same series). Accordingly, in act 303, causing the data for the memory location to be logged on behalf of the first processing unit by reference to log data that was previously logged on behalf of the second processing unit could comprise one or more of logging an address of the memory location, or logging an address of the memory location and ordering data, such as a MIN.

A second method logs by reference to a previous owner of a cache line storing the data. For example, suppose that processing unit A2 in FIG. 2A has logged a first influx of data. Suppose also that the first influx caused the data to be cached in a cache line of an (N+i)-level cache (e.g., cache L2-A1)—with processing unit A2 being identified an owner of the cache line. Later, if processing unit A1 causes a second influx of the same data, processing unit A1 could become the owner of this cache line in the (N+i)-level cache. Processing unit A1 could then store a log entry that identifies the prior owner of the cache line (i.e., processing unit A2) so that the A2's log entry can be used later to obtain the data. This means that logging by reference may involve recording the identity of a cache line along with a prior owner of a cache line (e.g., potentially avoiding recording memory addresses and memory values). Accordingly, in act 303, causing the data for the memory location to be logged on behalf of the first processing unit by reference to log data that was previously logged on behalf of the second processing unit could comprise logging the second processing unit as a previous owner of a cache line corresponding to the memory location.

A third method logs by reference to CCP data. For example, as mentioned, CCPs can store cache coherence state about each cache line as different processing units take it for reading and writing. The granularity of this data may vary depending on processor implementation, but could, for example, track the cache coherence state of each cache line as it relates to each processing unit, track the cache coherence state of each cache line along with an index (e.g., 0, 1, 2, 3, etc.) to the processing unit that owns the current cache line state, etc. The third method utilizes available CCP data to track which processing unit(s) previously owned cache coherence state for a cache line, which cache coherence state can then be used to identify which processing unit(s) has logged the value of a cache line. This means that logging by reference may involve recording CCP data for a cache line (e.g., again potentially avoiding recording memory addresses and memory values). Accordingly, in act 303, causing the data for the memory location to be logged on behalf of the first processing unit by reference to log data that was previously logged on behalf of the second processing unit could comprise logging CCP data referencing the second processing unit.

A fourth method logs by reference to cache way. As mentioned, set-associative caches can be used for determining whether a cache line has been logged through use of way-locking. For example, suppose way-locking is used to reserve one or more ways for processing unit P2, and that P2 logs a first influx of data. The first influx also results an (N+i)-level cache (e.g., cache L2-A1) storing data of the first influx in a cache line associated with that way. When another processing unit (e.g., P1) has a second influx of the same data, the presence of this cache line in the (N+i)-level cache indicates that P2 has already logged the data. Embodiments can log a reference to P2's log data based on noting the way in which the cache line is stored and can again potentially avoid logging memory addresses and memory values. This embodiment can also be used in connection with recording ordering information (e.g., MINs) to order events between P1 and P2. Accordingly, in act 303, causing the data for the memory location to be logged on behalf of the first processing unit by reference to log data that was previously logged on behalf of the second processing unit could comprise one or more logging a reference to a cache way, or logging a reference to a cache way and ordering data.

In addition to logging an influx for a first processing unit based on a prior influx by a second processing unit, embodiments also include optimizations for reducing (and even eliminating) logging when there are multiple influxes of the same data by a single processing unit. For example, referring to FIG. 2A, processing unit A1 could cause a cache miss in an N-level cache (e.g., the L1-A1 cache) for particular data at a memory location. In response, the cache hierarchy can import that data into the L1-A1 cache, and potentially also into an (N+i)-level cache (e.g., the L2-A1 cache and/or the L3-A cache). In addition, the influx can be logged by value for processing unit A1. Later, this data could be evicted from the L1-A1 cache. In typical cache environments, this could result in the data also being proactively evicted from the L2-A1 cache and/or the L3-A cache. However, rather than causing eviction(s) in the L2-A1 and/or L3-A caches, embodiments could instead retain the appropriate cache line(s) in one or more of these (N+i)-level caches. Accordingly, method 300 can comprise evicting a first cache line in the first N-level cache that corresponds to the memory location, while retaining a second cache line in the (N+i)-level cache that corresponds to the memory location.

Later, if processing unit A1 causes a subsequent cache miss in the L1-A1 cache for the same data, the retained cache line(s) in an (N+i)-level cache (e.g., the L2-A1 and/or L3-A caches) can be used to determine that this data was already logged on behalf of processing unit A1. Thus, in some embodiments, this subsequent cache miss is logged in reference to the prior log entry by processing unit A1. In other embodiments, a log entry could be omitted entirely for this subsequent cache miss—because processing unit A1 already has the data in its trace. Accordingly, method 300 can comprise, based on detecting a subsequent influx to the first N-level cache, the subsequent influx also comprising the data stored at the memory location, causing the subsequent influx to be logged by reference based on presence of the second cache line. Additionally, or alternatively, method 300 can comprise (i) detecting a subsequent influx to the first N-level cache based on additional code execution at the first processing unit, the subsequent influx also comprising the data stored at the memory location, and (ii) based at least on detecting the subsequent influx to the first N-level cache, and based at least on presence of the second cache line, determining that that the subsequent influx need not be logged.

Accordingly, the embodiments herein create bit-accurate "time travel" trace recordings based on tracing the effects of execution across a plurality of processing units using at least two tiers or layers of processor caches. This could include modifications to processor hardware and/or microcode that assist in (i) detecting influxes (i.e., cache misses) to an inner or "lower-layer" processor cache based on activity by a traced processing unit, and (ii) using an outer or "upper-layer" shared processor cache to determine if data of a given influx has already been logged on behalf of another traced processing unit. If that data has already been logged, then the influx can be logged by reference to the prior log entry. These techniques can be extended to "N" levels of caches. Recording trace files in this manner may need only modest processor modifications and, when compared to prior trace recording approaches, it can reduce by several orders of magnitude both the performance impact of trace recording as well as trace file size.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:
1. A computing device, comprising:
a plurality of processing units;
a plurality of N-level caches;
an (N+i)-level cache that is associated with two or more of the plurality of N-level caches, and that is configured as a backing store for the plurality of N-level caches; and
control logic that configures the computing device to perform at least the following:
    detect an influx to a first N-level cache of plurality of N-level caches, the influx comprising data stored at a memory location; and
    based on detecting the influx to the first N-level cache, check the (N+i)-level cache to determine if the data for the memory location has been previously logged on behalf of a second processing unit, and performing one of:
        when the data for the memory location has been previously logged on behalf of the second processing unit, cause the data for the memory location to be logged on behalf of the first processing unit by reference to log data that was previously logged on behalf of the second processing unit; or
        when the data for the memory location has not been previously logged on behalf of the second processing unit, cause the data for the memory location to be logged by value on behalf of the first processing unit.

2. The computing device of claim 1, wherein checking the (N+i)-level cache to determine if the data for the memory location has been previously logged on behalf of the second processing unit comprises one or more of:
    determining if a cache line in the (N+i)-level cache that corresponds to the memory location has one or more accounting bits set;
    determining if a cache line in the (N+i)-level cache that corresponds to the memory location is stored in a way that corresponds to a logged processing unit; or
    determining if a cache line in the (N+i)-level cache that corresponds to the memory location has associated cache coherence protocol (CCP) state data that is usable to determine that the cache line has been logged.

3. The computing device of claim 1, wherein i equals 1, such that the (N+i)-level cache comprises an (N+1)-level cache.

4. The computing device of claim 1, wherein i equals 2, such that the (N+i)-level cache comprises an (N+2)-level cache.

5. The computing device of claim 1, wherein:
    i equals 1, such that the (N+i)-level cache comprises an (N+1)-level cache;
    the computing device also comprises an (N+2)-level cache that is configured as a backing store for the (N+1)-level cache; and
    checking the (N+1)-level cache to determine if the data for the memory location has been previously logged on behalf of the second processing unit comprises:
        determining that no cache line in the (N+1)-level cache corresponds to the memory location; and
        checking the (N+2)-level cache to determine if the data for the memory location has been previously logged on behalf of the second processing unit.

6. The computing device of claim 1, wherein causing the data for the memory location to be logged on behalf of the first processing unit by reference to log data that was previously logged on behalf of the second processing unit comprises one or more of:
 logging an address of the memory location;
 logging an address of the memory location and ordering data;
 logging a reference to a cache way;
 logging a reference to a cache way and ordering data;
 logging the second processing unit as a previous owner of a cache line corresponding to the memory location; or
 logging cache coherence protocol (CCP) data referencing the second processing unit.

7. The computing device of claim 1, wherein causing the data for the memory location to be logged on behalf of the first processing unit comprises delaying the logging based on availability of one or both of processor or memory resources.

8. The computing device of claim 1, wherein delaying the logging comprises invalidating a cache line to retain the data for the memory location for the delayed logging.

9. The computing device of claim 1, wherein the control logic also configures the computing device to perform at least the following:
 evict a first cache line in the first N-level cache that corresponds to the memory location, while retaining a second cache line in the (N+i)-level cache that corresponds to the memory location; and
 based on detecting a subsequent influx to the first N-level cache, the subsequent influx also comprising the data stored at the memory location, cause the subsequent influx to be logged by reference based on presence of the second cache line.

10. The computing device of claim 1, wherein the control logic also configures the computing device to perform at least the following:
 evict a first cache line in the first N-level cache that corresponds to the memory location, while retaining a second cache line in the (N+i)-level cache that also corresponds to the memory location;
 detect a subsequent influx to the first N-level cache based on additional code execution at the first processing unit, the subsequent influx also comprising the data stored at the memory location; and
 based at least on detecting the subsequent influx to the first N-level cache, and based at least on presence of the second cache line, determine that that the subsequent influx need not be logged.

11. A method for trace recording based on recording an influx to a lower-level cache by reference to prior log data based on knowledge of one or more upper-level caches, the method being implemented at a computing device that includes (i) a plurality of processing units, (ii) a plurality of N-level caches, and (iii) an (N+i)-level cache that is associated with two or more of the plurality of N-level caches, and that is configured as a backing store for the plurality of N-level caches, the method comprising:
 detecting an influx to a first N-level cache of plurality of N-level caches, the influx comprising data stored at a memory location; and
 based on detecting the influx to the first N-level cache, checking the (N+i)-level cache to determine if the data for the memory location has been previously logged on behalf of a second processing unit, and performing one of:
  when the data for the memory location has been previously logged on behalf of the second processing unit, causing the data for the memory location to be logged on behalf of the first processing unit by reference to log data that was previously logged on behalf of the second processing unit; or
  when the data for the memory location has not been previously logged on behalf of the second processing unit, causing the data for the memory location to be logged by value on behalf of the first processing unit.

12. The method of claim 11, wherein checking the (N+i)-level cache to determine if the data for the memory location has been previously logged on behalf of the second processing unit comprises one or more of:
 determining if a cache line in the (N+i)-level cache that corresponds to the memory location has one or more accounting bits set;
 determining if a cache line in the (N+i)-level cache that corresponds to the memory location is stored in a way that corresponds to a logged processing unit; or
 determining if a cache line in the (N+i)-level cache that corresponds to the memory location has associated cache coherence protocol (CCP) state data that is usable to determine that the cache line has been logged.

13. The method of claim 11, wherein i equals 1, such that the (N+i)-level cache comprises an (N+1)-level cache.

14. The method of claim 11, wherein i equals 2, such that the (N+i)-level cache comprises an (N+2)-level cache.

15. The method of claim 11, wherein:
 i equals 1, such that the (N+i)-level cache comprises an (N+1)-level cache;
 the computing device also comprises an (N+2)-level cache that is configured as a backing store for the (N+1)-level cache; and
 checking the (N+1)-level cache to determine if the data for the memory location has been previously logged on behalf of the second processing unit comprises:
  determining that no cache line in the (N+1)-level cache corresponds to the memory location; and
  checking the (N+2)-level cache to determine if the data for the memory location has been previously logged on behalf of the second processing unit.

16. The method of claim 11, wherein causing the data for the memory location to be logged on behalf of the first processing unit by reference to log data that was previously logged on behalf of the second processing unit comprises one or more of:
 logging an address of the memory location;
 logging an address of the memory location and ordering data;
 logging a reference to a cache way;
 logging a reference to a cache way and ordering data;
 logging the second processing unit as a previous owner of a cache line corresponding to the memory location; or
 logging cache coherence protocol (CCP) data referencing the second processing unit.

17. The method of claim 11, wherein causing the data for the memory location to be logged on behalf of the first processing unit comprises delaying the logging, including invalidating a cache line to retain the data for the memory location for the delayed logging.

18. The method of claim 11, further comprising:
 evicting a first cache line in the first N-level cache that corresponds to the memory location, while retaining a second cache line in the (N+i)-level cache that corresponds to the memory location; and
 based on detecting a subsequent influx to the first N-level cache, the subsequent influx also comprising the data stored at the memory location, causing the subsequent influx to be logged by reference based on presence of the second cache line.

19. The method of claim 11, further comprising:

evicting a first cache line in the first N-level cache that corresponds to the memory location, while retaining a second cache line in the (N+i)-level cache that also corresponds to the memory location;

detecting a subsequent influx to the first N-level cache based on additional code execution at the first processing unit, the subsequent influx also comprising the data stored at the memory location; and based at least on detecting the subsequent influx to the first N-level cache, and based at least on presence of the second cache line, determining that that the subsequent influx need not be logged.

20. A computer program product comprising one or more hardware storage devices having stored thereon computer-executable instructions that configure a computing device that includes (i) a plurality of processing units, (ii) a plurality of N-level caches, and (iii) an (N+i)-level cache that is associated with two or more of the plurality of N-level caches, and that is configured as a backing store for the plurality of N-level caches, to perform at least the following:

detect an influx to a first N-level cache of plurality of N-level caches, the influx comprising data stored at a memory location; and based on detecting the influx to the first N-level cache, check the (N+i)-level cache to determine if the data for the memory location has been previously logged on behalf of a second processing unit, and performing one of:

when the data for the memory location has been previously logged on behalf of the second processing unit, cause the data for the memory location to be logged on behalf of the first processing unit by reference to log data that was previously logged on behalf of the second processing unit; or when the data for the memory location has not been previously logged on behalf of the second processing unit, cause the data for the memory location to be logged by value on behalf of the first processing unit.

* * * * *